(12) United States Patent
Jung et al.

(10) Patent No.: US 10,871,683 B2
(45) Date of Patent: Dec. 22, 2020

(54) STEREOSCOPIC DISPLAY DEVICE (71) Applicant: LG DISPLAY CO., LTD., Seoul (KR)

(72) Inventors: Sung-Min Jung, Seoul (KR); Hoon Kang, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/208,359

(22) Filed: Dec. 3, 2018

(65) Prior Publication Data

US 2019/0204692 A1 Jul. 4, 2019

(30) Foreign Application Priority Data

Dec. 29, 2017 (KR) ........................ 10-2017-0184365

(51) Int. Cl.
*G02F 1/1343* (2006.01)
*G02B 30/26* (2020.01)
*G02B 30/34* (2020.01)
*H04N 13/361* (2018.01)
*G02F 1/1347* (2006.01)
*G02B 26/00* (2006.01)

(52) U.S. Cl.
CPC ....... *G02F 1/134309* (2013.01); *G02B 30/26* (2020.01); *G02B 30/34* (2020.01); *G02F 1/13471* (2013.01); *H04N 13/361* (2018.05); *G02B 26/005* (2013.01)

(58) Field of Classification Search
CPC ........... H04N 13/361; G09G 2320/068; G02B 30/26; G02B 30/34; G02B 26/005; G02F 1/134309; G02F 1/13471
See application file for complete search history.

(56) References Cited

U.S. PATENT DOCUMENTS

| | | | |
|---|---|---|---|
| 2013/0208196 A1 | 8/2013 | Kim et al. | |
| 2013/0265622 A1* | 10/2013 | Christmas | G02B 27/0103 359/9 |
| 2014/0126038 A1 | 5/2014 | Choi et al. | |
| 2014/0146091 A1* | 5/2014 | Kang | G02B 27/26 345/690 |
| 2016/0266542 A1* | 9/2016 | Yamaichi | G03H 1/0005 |
| 2017/0085865 A1 | 3/2017 | Sumi et al. | |
| 2018/0246325 A1* | 8/2018 | Frisken | H04N 9/3126 |

FOREIGN PATENT DOCUMENTS

| | | |
|---|---|---|
| CN | 103221872 A | 7/2013 |
| CN | 103838033 A | 6/2014 |
| CN | 105611279 A | 5/2016 |
| EP | 2 736 257 A1 | 5/2014 |
| TW | 201118420 A | 6/2011 |

OTHER PUBLICATIONS

Extended European Search Report dated May 7, 2019 for European Patent Application No. 18213057.5.
Office Action dated Apr. 15, 2020 issued in corresponding European Patent Application No. 18 213 057.5 (6 pages).
Chinese Office Action dated Jul. 14, 2020 issued in corresponding Patent Application No. 201811452830.2 with English Translation (19 pages).

\* cited by examiner

*Primary Examiner* — Jia X Pan
(74) *Attorney, Agent, or Firm* — Polsinelli PC (57) ABSTRACT

A stereoscopic display device may include a light control panel on a display panel, so that light emitted from the display panel may emit in a direction different from adjacent frame and the visibility of the stereoscopic image which is provided to user may be increased without the deterioration of the resolution.

7 Claims, 7 Drawing Sheets

STEREOSCOPIC DISPLAY DEVICE

CROSS-REFERENCE TO RELATED APPLICATION

This application claims the priority benefit of Korean Patent Application No. 10-2017-0184365, filed on Dec. 29, 2017, which is hereby incorporated in its entirety by reference as if fully set forth herein.

BACKGROUND

Field of the Disclosure

The present disclosure relates to a stereoscopic display device realizing a stereoscopic image using light field technology.

Description of the Background

Generally, a display device includes a display panel which realizes an image. For example, the display device may include a liquid crystal panel having a liquid crystal, and/or an OLED panel having an organic light-emitting element.

The display device may provide a stereoscopic image to user. The stereoscopic image may be realized by a binocular disparity technology in which the display panel provides different images to the left eye and the right eye of the user. The stereoscopic image may include a virtual image realized on an actual image. However, in the stereoscopic display device using the binocular disparity technology, the virtual image realized by the display panel may have focus-convergence mismatching with the actual image. Thus, in the stereoscopic display device, the visibility of the stereoscopic image can be decreased.

SUMMARY

Accordingly, the present disclosure is directed to a stereoscopic display device that substantially obviates one or more problems due to limitations and disadvantages of the related art.

In addition, the present disclosure is to provide a stereoscopic display device capable of increasing the visibility of the stereoscopic image.

Further, the present disclosure is to provide a stereoscopic display device in which a virtual image realized on an actual image may have focus-convergence matching with the actual image.

Additional advantages, objects, and features of the disclosure will be set forth in part in the description which follows and in part will become apparent to those having ordinary skill in the art upon examination of the following or may be learned from practice of the disclosure. Other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a stereoscopic display device including a display panel. The display panel is driven by a display driver. A light control panel is disposed on the display panel. The light control panel is controlled by a control panel driver. The moving direction of light passing through the light control panel is changed by the control panel driver for each frame.

The display panel may display a specific image in a time-division by the display driver.

The light control panel may include a water layer and an oil layer which are stacked between a first control substrate and a second control substrate.

An interface between the water layer and the oil layer may be changed for each frame.

The light control panel may further include a first control electrode and a second control electrode which are disposed on the second control substrate. The second control electrode may be spaced away from the first control electrode. The oil layer may be disposed between the first control electrode and the second control electrode. The voltage difference between the first control electrode and the second control electrode may be changed by the control panel driver for each frame.

The display panel may include a light-emitting element between a first display substrate and a second display substrate.

A micro-lens array may be disposed between the display panel and the light control panel.

A convex lens may be disposed on the light control panel. A combiner may be disposed on the convex lens.

BRIEF DESCRIPTION OF THE DRAWINGS

The accompanying drawings, which are included to provide a further understanding of the disclosure and are incorporated in and constitute a part of this application, illustrate aspect(s) of the disclosure and together with the description serve to explain the principle of the disclosure. In the drawings.

DETAILED DESCRIPTION

Hereinafter, details related to the technical configurations and operational effects of the aspects of the present disclosure will be clearly understood by the following detailed description with reference to the drawings, which illustrate some aspects of the present disclosure. Here, the aspects of the present disclosure are provided in order to allow the technical sprit of the present disclosure to be satisfactorily transferred to those skilled in the art, and thus the present disclosure may be embodied in other forms and is not limited to the aspects described below.

In addition, the same or extremely similar elements may be designated by the same reference numerals throughout the specification, and in the drawings, the lengths and thickness of layers and regions may be exaggerated for convenience. It will be understood that, when a first element is referred to as being "on" a second element, although the first element may be disposed on the second element so as to come into contact with the second element, a third element may be interposed between the first element and the second element.

Here, terms such as, for example, "first" and "second" may be used to distinguish any one element with another element. However, the first element and the second element may be arbitrarily named according to the convenience of those skilled in the art without departing the technical sprit of the present disclosure.

The terms used in the specification of the present disclosure are merely used in order to describe particular aspects, and are not intended to limit the scope of the present disclosure. For example, an element described in the singular form is intended to include a plurality of elements unless the context clearly indicates otherwise. In addition, in the specification of the present disclosure, it will be further understood that the terms "comprises" and "includes" specify the presence of stated features, integers, steps, operations, elements, components, and/or combinations thereof, but do not preclude the presence or addition of one or more other features, integers, steps, operations, elements, components, and/or combinations.

Unless otherwise defined, all terms (including technical and scientific terms) used herein have the same meaning as that commonly understood by one of ordinary skill in the art to which example aspects belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Figure 1A:
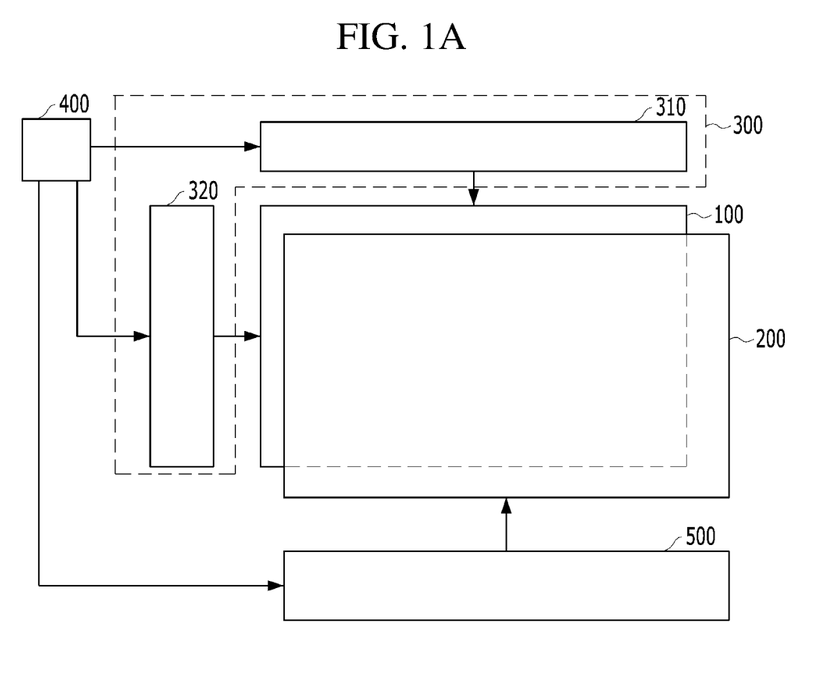
FIG. 1A is a view schematically showing a stereoscopic display device according to an aspect of the present disclosure.
Figure 1B:
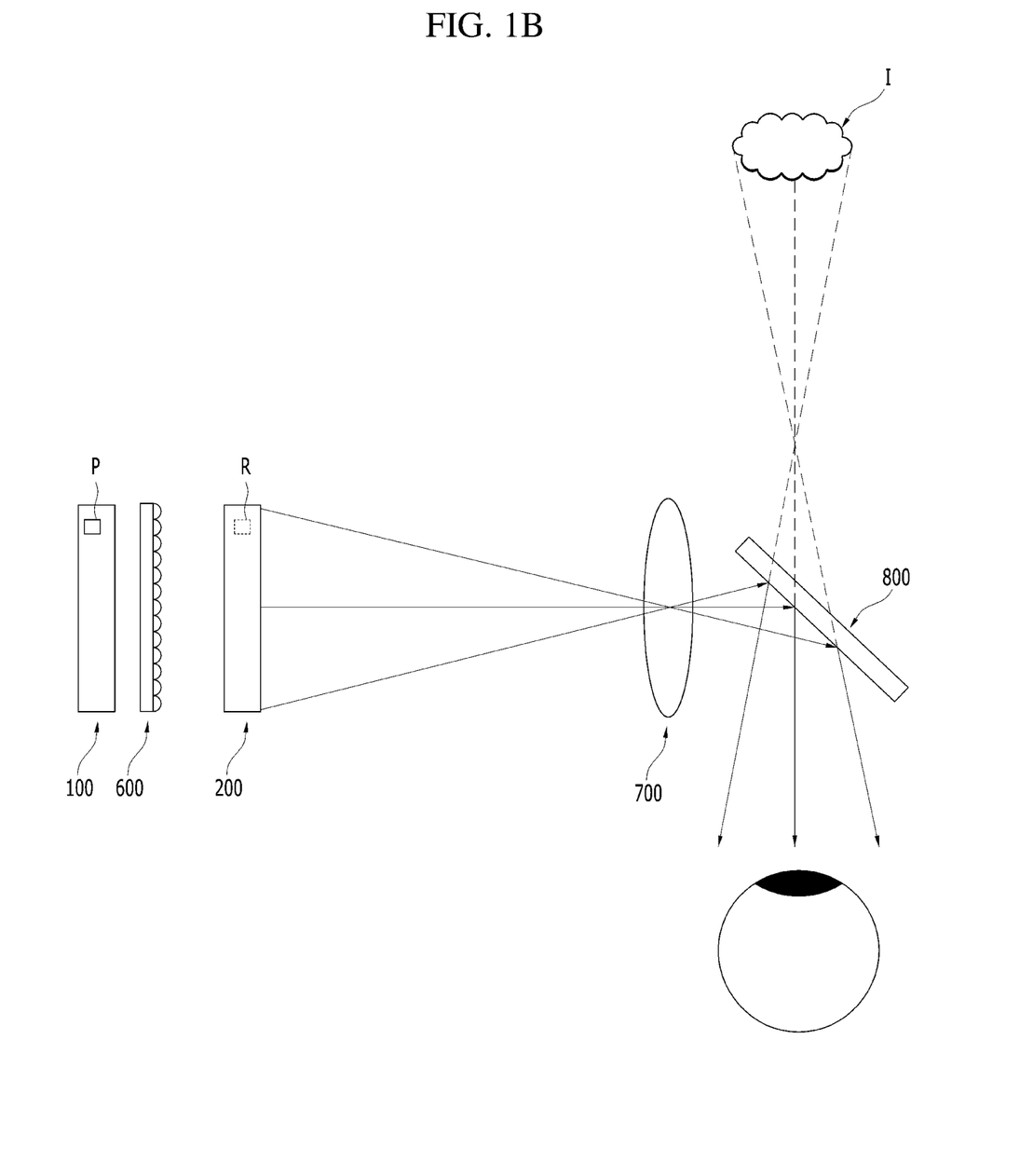
FIG. 1B is a view showing a relative position of a display panel and a light control panel of the stereoscopic display device according to the aspect of the present disclosure, and a moving path of light passing through the light control panel.
Figure 2A:
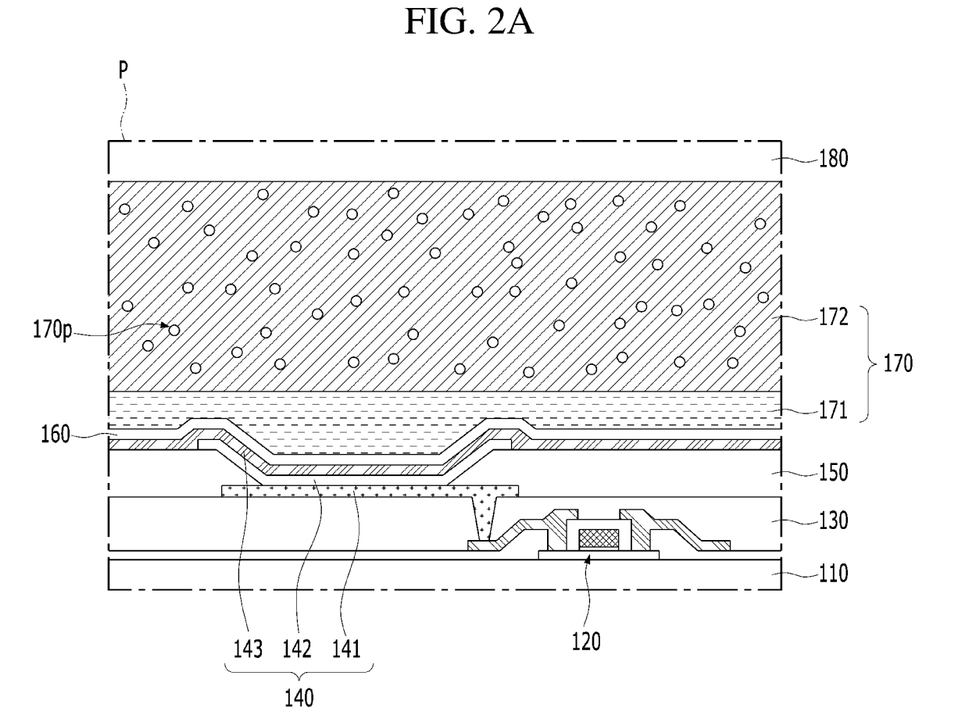
FIG. 2A is an enlarged view of P region in FIG. 1B.
Figure 2B:
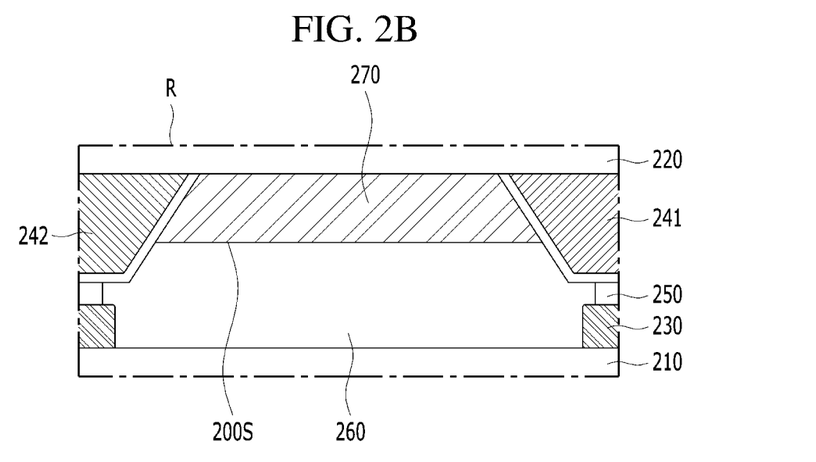
FIG. 2B is an enlarged view of R region in FIG. 1B.

FIG. 1A is a view schematically showing a stereoscopic display device according to an aspect of the present disclosure. FIG. 1B is a view showing a relative position of a display panel and a light control panel of the stereoscopic display device according to the aspect of the present disclosure, and a moving path of light passing through the light control panel. FIG. 2A is an enlarged view of P region in FIG. 1B. FIG. 2B is an enlarged view of R region in FIG. 1B.

Referring FIGS. 1A, 1B, 2A and 2B, the stereoscopic display device according to the aspect of the present disclosure may include a display panel 100. The display panel 100 may realize a specific image and a virtual image (I) may be recognized by a user's eyes. For example, the display panel 100 may be an OLED panel in which a light-emitting element 140 is disposed between a first display substrate 110 and a second display substrate 180.

The first display substrate 110 may support the light-emitting element 140. The first display substrate 110 may include an insulating material. For example, the first display substrate 110 may include glass or plastic.

The light-emitting element 140 may emit light displaying a specific color. For example, the light-emitting element 140 may include a first display electrode 141, a light-emitting layer 142 and a second display electrode 143, which are sequentially stacked on the first display substrate 110.

The first display electrode 141 may include a conductive material. The first display electrode 141 may include a material having high reflectance. For example, the first display electrode 141 may include a metal, such as aluminum (Al) and silver (Ag). The first display electrode 141 may have a multi-layer structure. For example, the first display electrode 141 may have a structure in which a reflective electrode formed of a material having high reflectance is disposed between transparent electrodes formed of transparent conductive material, such as ITO and IZO.

The light-emitting layer 142 may generate light having luminance corresponding to a voltage difference between the first display electrode 141 and the second display electrode 143. For example, the light-emitting layer 142 may include an emission material layer (EML) including an emission material. The emission material may include an inorganic material, an organic material or a hybrid material. The light-emitting layer 142 may have a multi-layer structure. For example, the light-emitting layer 142 may further include at least one of a hole injection layer (HIL), a hole transport layer (HTL), an electron transport layer (ETL), and an electron injection layer (EIL).

The second display electrode 143 may include a conductive material. The second display electrode 143 may include a material different from the first display electrode 141. For example, the second display electrode 143 may be a transparent electrode formed of a transparent conductive material, such as ITO and IZO. Thus, in the light-emitting element 140 of the stereoscopic display device according to the aspect of the present disclosure, the light generated by the light-emitting layer 142 may be emitted through the second display electrode 143.

A thin film transistor 120 may be disposed between the first display substrate 110 and the light-emitting element 140. The thin film transistor 120 may be turn on/off according to a gate signal supplied through a gate line. The light-emitting element 140 may be controlled by the thin film transistor 120. For example, the thin film transistor 120 may apply a driving current corresponding to a data signal supplied through a data line to the first display electrode 141 of the light-emitting element 140. The thin film transistor 120 may include a semiconductor pattern, a gate insulating layer, a gate electrode, an interlayer insulating layer, a source electrode and a drain electrode.

An over-coat layer 130 may be disposed between the thin film transistor 120 and the light-emitting element 140. The over-coat layer 130 may remove a thickness difference due to the thin film transistor 120. For example, an upper surface of the over-coat layer 130 opposite to the first display substrate 110 may be a flat surface. The first display electrode 141 of the light-emitting element 140 may be electrically coupled to the drain electrode of the thin film transistor 120. For example, the over-coat layer 130 may include an electrode contact hole partially exposing the drain electrode of the thin film transistor 120. The over-coat layer 130 may include an insulating material. For example, the over-coat layer 130 may include an organic insulating material.

A bank insulating layer 150 may be disposed on the over-coat layer 130. The light-emitting element 140 may be independently driven by the bank insulating layer 150. For example, the bank insulating layer 150 may cover an edge of the first display electrode 141. The light-emitting layer 142 and the second display electrode 143 may be stacked on a portion of the first display electrode 141 which is not covered by the bank insulating layer 150. The light-emitting layer 142 and/or the second display electrode 143 may be extended onto the bank insulating layer 150. The bank insulating layer 150 may include an insulating material. For example, the bank insulating layer 150 may include an organic insulating material. The bank insulating layer 150 may include a material different from the over-coat layer 130.

An upper passivation layer 160 may be disposed on the light-emitting element 140. The upper passivation layer 160 may prevent the damage of the light-emitting element 140 due to the external impact and moisture. For example, the upper passivation layer 160 may entirely cover a surface of the second display electrode 143 facing the second display substrate 180. The upper passivation layer 160 may include an insulating material. The upper passivation layer 160 may have a multi-layer structure. For example, the upper passivation layer 160 may have a structure in which an organic layer formed of an organic material is disposed between inorganic layers formed of an inorganic material.

The second display substrate 180 may be disposed on the upper passivation layer 160. The second display substrate 180 may include an insulating material. The second display substrate 180 may include a transparent material. For example, the second display substrate 180 may include glass or plastic. Thus, the light emitted from the light-emitting element 140 may be emitted to the outside through the second display substrate 180.

An adhesive layer 170 may be disposed between the upper passivation layer 160 and the second display substrate 180. For example, the second display substrate 180 may be coupled to the first display substrate 110 in which the light-emitting element 140 is formed, by the adhesive layer 170. The adhesive layer 170 may have a multi-layer structure. For example, the adhesive layer 170 may include a lower adhesive layer 171 and an upper adhesive layer 172 which are sequentially stacked. The upper adhesive layer 172 may include a moisture-absorbing material 170p. The lower adhesive layer 171 may relieve the stress applied to the light-emitting element 140 due to the expansion of the moisture-absorbing material 170p.

A light control panel 200 may be disposed on the display panel 100. The moving direction of light passing through the light control panel 200 may be changed by the state of the light control panel 200. For example, the light control panel 200 may include a water layer 260 and an oil layer 270 which are stacked between a first control substrate 210 and a second control substrate 220. The moving direction of the light passing through the light control panel 200 may be affected to an interface 200S between the water layer 260 and the oil layer 270.

Figure 3A:
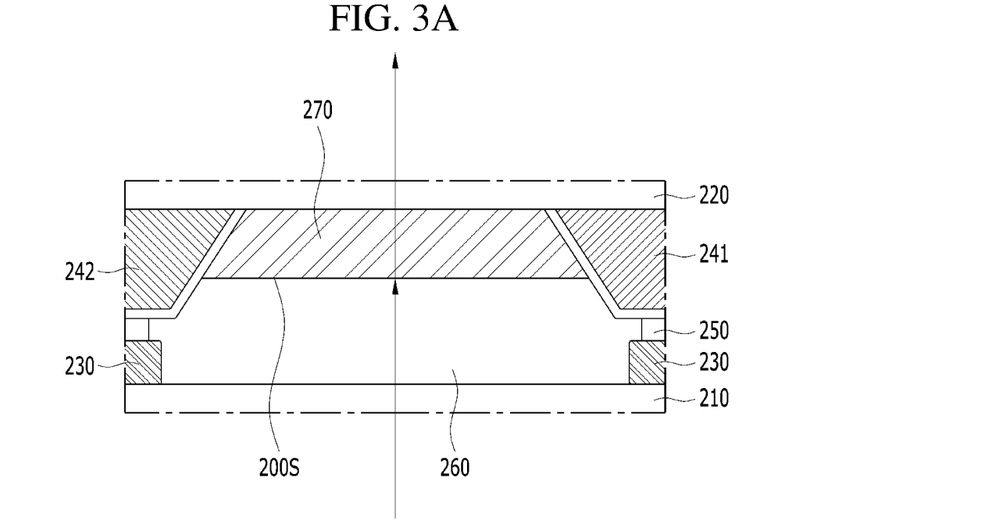
FIGS. 3A to 3C are views showing the emitting direction of light according to the state of the light control panel of the stereoscopic display device according to the aspect of the present disclosure.
Figure 3B:
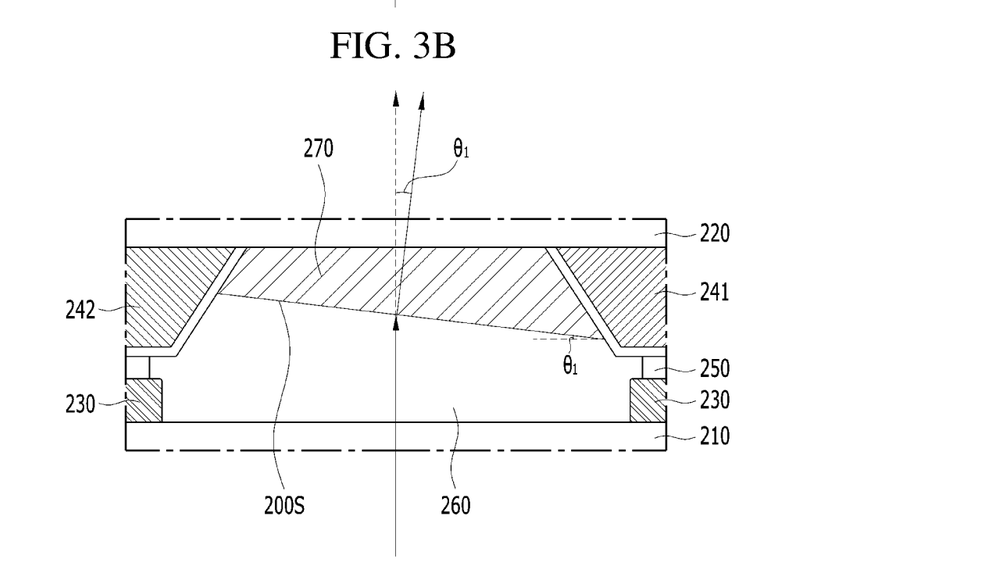
Figure 3C:
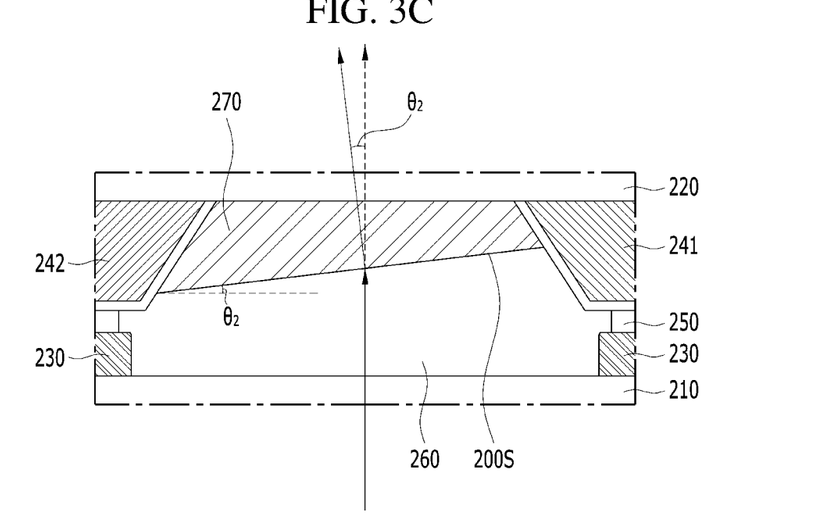

FIGS. 3A to 3C are views showing the emitting direction of light according to the state of the light control panel of the stereoscopic display device according to the aspect of the present disclosure.

As shown in FIG. 3A, when the interface 200S between the water layer 260 and the oil layer 270 is parallel with an upper surface of the first control substrate 210 facing the second control substrate 220, light passing through the water layer 260 may transmit through the oil layer 270 without the change of the moving direction.

As shown in FIGS. 3B and 3C, when the interface 200S between the water layer 260 and the oil layer 270 is inclined in a direction, light incident on the water layer 260 may be refracted. For example, as shown in FIG. 3B, when the interface 200S between the water layer 260 and the oil layer 270 is inclined in a right direction (the interface 200S is inclined at an angle $\theta_1$ with respect to a horizontal direction, as shown in FIG. 3B), the moving direction of the light passing through the oil layer 270 may be inclined in the right direction with respect to the moving direction of the light incident on the water layer 260. For example, as shown in FIG. 3C, when the interface 200S between the water layer 260 and the oil layer 270 is inclined in a left direction (the interface 200S is inclined at an angle $\theta_2$ with respect to a horizontal direction, as shown in FIG. 3C), the moving direction of the light passing through the oil layer 270 may be inclined in the left direction with respect to the moving direction of the light incident on the water layer 260. The inclination $\theta_1$ and $\theta_2$ of the light passing through the oil layer 270 may be the same as the inclination $\theta_1$ and $\theta_2$ of the interface 200S between the water layer 260 and the oil layer 270.

The light control panel 200 may include control electrodes 230, 241 and 242 to control the interface 200S between the water layer 260 and the oil layer 270. For example, the light control panel 200 may include lower control electrodes 230 which are disposed on the upper surface of the first control substrate 210, and a first upper control electrode 241 and a second upper control electrode 242 which are disposed on a lower surface of the second control substrate 220 facing the first control substrate 210. The second upper control electrode 242 may be spaced away from the first upper control electrode 241. An intermediate insulating layer 250 is disposed between the lower control electrodes 230 and the first upper control electrode 241, and between the lower control electrode 230 and the second upper control electrode 242. For example, the first upper control electrode 241 and the second upper control electrode 242 may be insulated from the lower control electrodes 230 by the intermediate insulating layer 250. The water layer 260 and the oil layer 270 may be disposed inside a space defined by the control electrodes 230, 241 and 242, and the intermediate insulating layer 250.

The water layer 260 may be disposed between the lower control electrodes 230. The voltage applied to the lower control electrodes 230 may be the same. The oil layer 270 may be disposed between the first upper control electrode 241 and the second upper control electrode 242. A voltage applied to the second upper control electrode 242 may be different from a voltage applied to the first upper control electrode 241. For example, when the voltage applied to the first upper control electrode 241 is higher than the voltage applied to the second upper control electrode 242, the interface 200S between the water layer 260 and the oil layer 270 may be inclined in the right direction, as shown in FIG. 3B. When the voltage applied to the first upper control electrode 241 is lower than the voltage applied to the second upper control electrode 242, the interface 200S between the water layer 260 and the oil layer 270 may be inclined in the left direction, as shown in FIG. 3C. The voltage applied to the first upper control electrode 241 and the voltage applied to the second upper control electrode 242 may be higher than the voltage applied to the lower control electrodes 230. Thus, in the stereoscopic display device according to the aspect of the present disclosure, the moving direction of the light passing through the light control panel 200 may be adjusted by the voltage applied to the control electrodes 230, 241 and 242 of the light control panel 200.

The display panel 100 may be controlled by a display driver 300, as shown in FIGS. 1A and 1B. The display drive 300 may provide signals for realizing the image to the display panel 100. For example, the display driver 300 may include a data driver 310 and a scan driver 320. The data driver 310 may provide the data signal to the display panel 100. The scan driver 320 may sequentially apply the scan signal to the display panel 100. The data signal applied by the data driver 310 may be synchronized with the scan signal applied by the scan driver 320.

The display driver 300 may control the display panel 100 such that the specific image realized by the display panel 100 may be displayed in a time division. For example, the display driver 300 may divide each frame into a plurality of sub-frames, and may divide the signal for realizing the specific image. The data driver 310 and the scan driver 320 may receive the divided signal from the display driver 300 for each sub-frame.

The display driver 300 may receive a signal necessary for the operation from the timing controller 400. For example, the timing controller 400 may provide digital video data and source timing control signal to the data driver 310. The scan driver 320 may receive clock signals, reset clock signals and a start signal from the timing controller 400.

The light control panel 200 may be controlled by a control panel driver 500. For example, the control panel driver 500 may adjust the interface 200S between the water layer 260 and the oil layer 270 by the voltage applied to the control electrodes 230, 241 and 242 of the light control panel 200. The control panel driver 500 may be electrically connected to the timing controller 400. Thus, the stereoscopic display device according to the aspect of the present disclosure may control the light control panel 200 in conjunction with the display panel 100.

The control panel driver 500 may change the voltage applied to the first upper control electrode 241 and the second upper control electrode 242 for each frame. For example, the interface 200S between the water layer 260 and the oil layer 270 may be changed for each frame. Thus, in the stereoscopic display device according the aspect of the present disclosure, the moving direction of the light passing through the light control panel 200 may be changed for each frame. For example, in the stereoscopic display device according the aspect of the present disclosure, the light emitted in the different direction by the light control panel 200 may be overlapped at a specific location to generate a virtual image. That is, the stereoscopic display device according the aspect of the present disclosure may realize the virtual image using light field technology by the display panel 100 and the light control panel 200. Therefore, in the stereoscopic display device according to the aspect of the present disclosure, the visibility of the virtual image may be increased.

A micro-lens array 600 may be disposed between the display panel 100 and the light control panel 200. Thus, in the stereoscopic display device according to the aspect of the present disclosure, the efficiency of the light emitted from the display panel 100 may be increased. A convex lens 700 may be disposed on the light control panel 200. A combiner 800 may be disposed on the convex lens 700. The combiner 800 may reflect light incident in the first direction, and may transmit light incident in the second direction. For example, the combiner 800 may include a beam splitter. The virtual image realized by the display panel 100 and the light control panel 200 may be reflected toward the user by the combiner 800. The combiner 800 may provide the actual image to the user by transmitting the light. Thus, in the stereoscopic display device according to the aspect of the present disclosure, the virtual image generated by the display panel 100 and the light control panel 200 may be realized on the actual image.

Accordingly, the stereoscopic display device according to the aspect of the present disclosure may generate the stereoscopic image including the virtual image realized by the light control panel 200 using light field technology. Thus, in the stereoscopic display device according to the aspect of the present disclosure, the virtual image may have focus-con-vergence matching with the actual image. Therefore, in the stereoscopic display device according to the aspect of the present disclosure, the visibility of the stereoscopic image including the virtual image realized on the actual image and the actual image may be increased.

Figure 4:
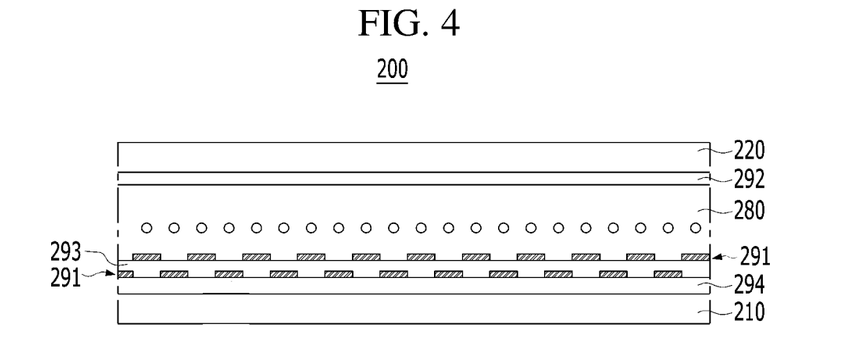
FIGS. 4, 5A and 5B are views showing the light control panel of the stereoscopic display device according to another aspect of the present disclosure, and the emitting direction of light.
Figure 5A:
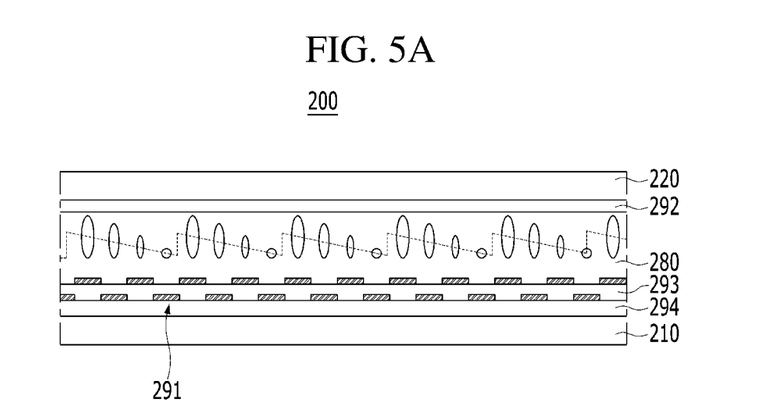
Figure 5B:
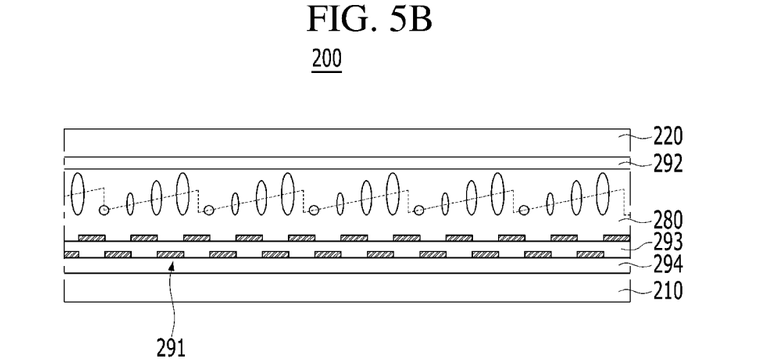

The stereoscopic display device according to the aspect of the present disclosure is described that the light control panel 200 is an electro-wetting device including the interface 200S between the water layer 260 and the oil layer 270. However, the stereoscopic display device according to another aspect of the present disclosure may include various types of the light control panel 200. For example, in the stereoscopic display device according to another aspect of the present disclosure, the light control panel 200 may include a liquid crystal layer 280 between the first control substrate 210 and the second control substrate 220, as shown in FIG. 4. That is, in the stereoscopic display device according to another aspect of the present disclosure, the light control panel 200 may be a liquid crystal panel. The light control panel 200 may include control electrodes 291 and 292, and insulating layers 293 and 294 to forming an inclined virtual boundary in the liquid crystal layer 280. For example, the liquid crystal layer 280 may be disposed between the control electrodes 291 and 292. Lower control electrodes 291 on a surface of the first control substrate 210 facing the second control substrate 220 may be separated from each other. Upper control electrodes 292 on a surface of the second control substrate 220 facing the first control substrate 210 may be a plate shape. Thus, in the stereoscopic display device according to another aspect of the present disclosure, the inclined virtual boundary may be formed inside the liquid crystal layer 280 by adjusting the voltage applied to the lower control electrodes 291, as shown in FIGS. 5A and 5B. Therefore, in the stereoscopic display device according to another aspect of the present disclosure, the degree of freedom for forming process may be improved.

The stereoscopic display device according to the aspect of the present disclosure is described that the light emitted from the display panel 100 is parallel with each other, and the moving direction of the light emitted from the display panel 100 is changed by the light control panel 200 for each frame, so that the specific image may be generated between the light control panel 200 and the combiner 800. However, the stereoscopic display device according to another aspect of the present disclosure may generate the specific image between the display panel 100 and the light control panel 200.

Figure 6:
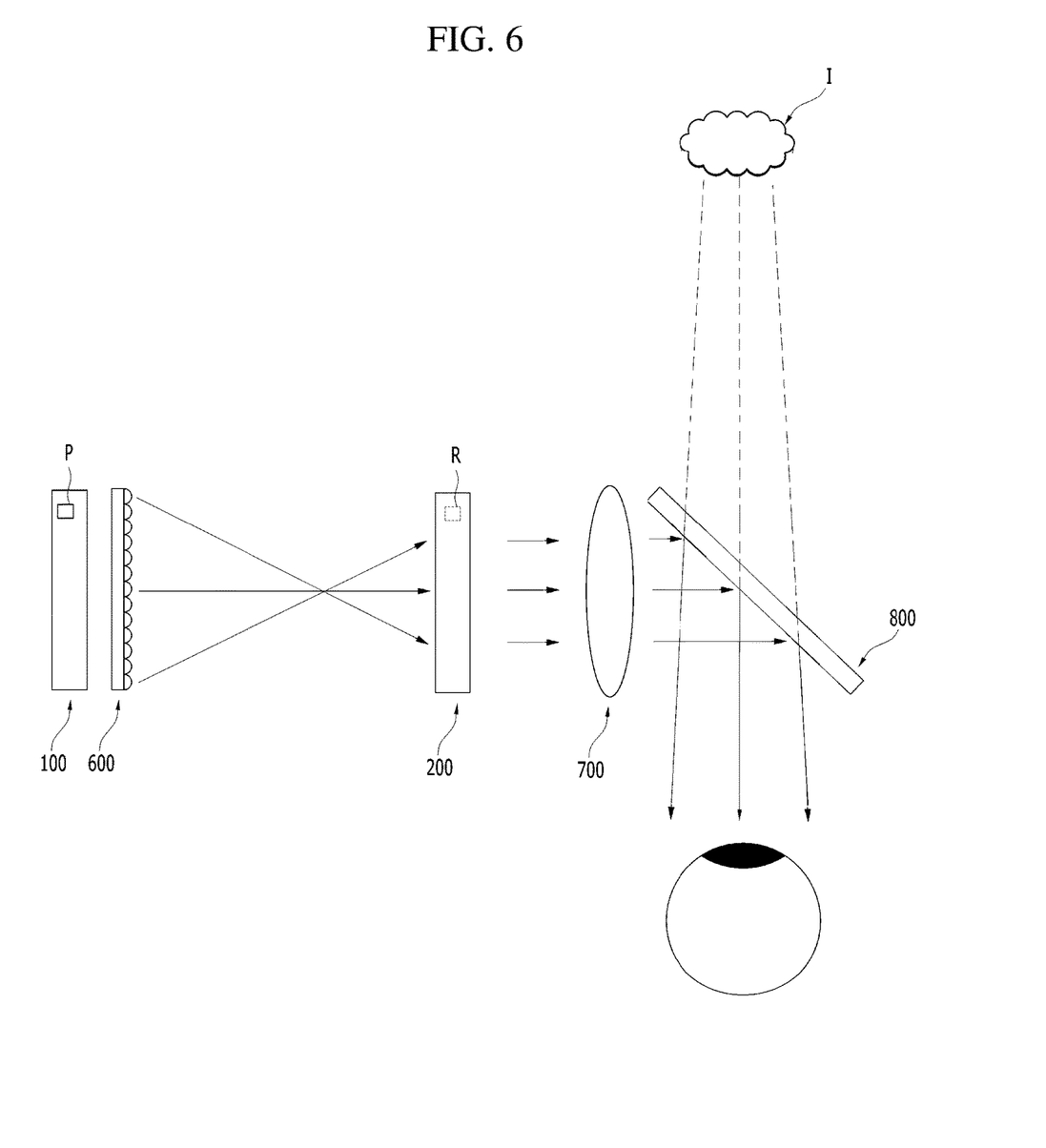
FIG. 6 is a view showing a relative position of the display panel and the light control panel of the stereoscopic display device according to further another aspect of the present disclosure, and a moving path of light passing through the light control panel.

For example, in the stereoscopic display device according to another aspect of the present disclosure, the moving direction of the light emitted from the display panel 100 may be changed in order to use light field technology, and the light passing through the light control panel 200 may be parallel with each other, so that the virtual image may be provided to the user, as shown FIG. 6. That is, in the stereoscopic display device according to another aspect of the present disclosure, the light emitted from the display panel 100 may be provided to the user by crossing between the display panel 100 and the light control panel 200. Thus, in the stereoscopic display device according to another aspect of the present disclosure, a distance between the image realized by the display panel 100 and the combiner 800 may be increased. The display location of a virtual image (I) recognized by the user may be the same as the focal length of the convex lens 700. For example, the user may recognize that the virtual image is realized at a location which is spaced away from the user by a value of sum of a distance between the image realized by the display panel 100 and the combiner 800 and a distance between the combiner 800 and the user. That is, the display distance of the virtual image provided to the user may be proportional to a distance between the image realized by the display panel 100 and the combiner 800, and a distance between the combiner 800 and the user. Thereby, in the stereoscopic display device according to the aspect of the present disclosure, the variable range of the location of the virtual image recognized by the user may be increased.

In the result, the stereoscopic display device according to the aspects of the present disclosure may realize the stereoscopic image using light field technology by the light control panel. Thus, the stereoscopic display device according to the aspects of the present disclosure may form the virtual image having focus-convergence matching with the actual image. Thereby, in the stereoscopic display device according to the aspects of the present disclosure, the visibility of the stereoscopic image provided to the user can be increased.

What is claimed is:

1. A stereoscopic display device comprising:
a display panel;
a display driver driving the display panel;
a light control panel disposed on the display panel, the light control panel including a water layer and an oil layer which are stacked between a first control substrate and a second control substrate;
a control panel driver controlling the light control panel,
a combiner on the light control panel, the combiner having inclination with respect to a surface of the light control panel; and
a convex lens between the light control panel and the combiner,
wherein the combiner includes a beam splitter, so that a virtual image generated by the display panel and the light control panel is realized on an actual image generated by light passing through the combiner,
wherein the control panel driver changes a moving direction of light passing through the light control panel during each frame,
wherein the light control panel further includes lower control electrodes on the first control substrate, a first upper control electrode on the second control substrate, and a second upper control electrode spaced away from the first upper control electrode on the second control substrate,
wherein the water layer is disposed between the lower control electrodes, and the oil layer is disposed between the first upper control electrode and the second upper control electrode,
wherein a moving direction of light emitted from the display panel is changed during each frame and the light emitted from the display panel is crossed between the display panel and the light control panel, and
wherein the light control panel changes the moving direction of the light emitted from the display panel to be parallel with each other.

2. The stereoscopic display device according to claim 1, wherein the display panel displays an image in a time-division by the display driver.

3. The stereoscopic display device according to claim 1, wherein the water layer is in contact with the first control substrate, and the oil layer is in contact with the second control substrate.

4. The stereoscopic display device according to claim 1, wherein an interface between the water layer and the oil layer is changed during each frame.

5. The stereoscopic display device according to claim 1, wherein a voltage difference between the first upper control electrode and the second upper control electrode is changed by the control panel driver during each frame.

6. The stereoscopic display device according to claim 1, wherein the display panel includes a light-emitting element between a first display substrate and a second display substrate.

7. The stereoscopic display device according to claim 1, further comprising a micro-lens array between the display panel and the light control panel.

* * * * *